Patented Mar. 7, 1950

2,500,019

UNITED STATES PATENT OFFICE 2,500,019

METHOD OF PRODUCING POLYCARBOXYLIC AMINO ACIDS

Frederick C. Bersworth, Verona, N. J.

No Drawing. Application October 8, 1946,
Serial No. 702,052

7 Claims. (Cl. 260—534)

This invention relates to chemical processes and more particularly to a method of forming polycarboxylic amino acids.

The object of the invention is to provide a method of converting the alpha amino acids to polycarboxylic amino acids.

Another object is to provide a method of converting the alpha amino acid content of protein materials into polycarboxylic amino acids.

A further object is to provide a method of converting protein hydrolysate alpha amino acids into the alkali metal salts of a polycarboxylic acid.

Still another object is to provide a relatively low cost polycarboxylic amino acid product for use in the arts and industries as water softening agents, dye leveler agents, detergents, water soluble lubricants, plasticizers, dispersion and buffering agents, and dispersants for metallic soaps.

In accordance with these objects I have discovered that the alkali metal salt of an alpha amino acid may be converted into a polycarboxylic amino acid by displacing the amino hydrogens of the alpha amino nitrogen group contained therein with a carboxylic acid group obtained by reacting formaldehyde with an alkali metal cyanide in a strongly alkaline aqueous solution at elevated temperatures within the range 30–100° C. in the presence of said alpha amino acid salt.

In this reaction the formaldehyde reacts with the cyanide to form a hydrine compound which compound, in the strongly alkaline solution, hydrolyzes with liberation of gaseous ammonia to form an alkali metal carboxylic acid salt product which salt product displaces the amino hydrogens of the alpha amino group if the alpha amino acid to form the polycarboxylic amino acid.

I have found that whereas the condensation, hydrolysis and substitution reactions above mentioned will occur at any temperature within the range 30–100° C., the rate at which these reactions occur varies with the temperature and that at any given temperature within this range the amount of the carboxylic acid salt product present at any one time in the reaction solution must be limited to that substantially immediately and completely reacted with the alpha amino acid salt, in order to avoid losses incident to the formation of side reaction products.

I have also found that it is necessary to exclude from the reaction solution atmospheric gases which by oxidation and $CO_2$ contamination tends to form undesirable oxidation and carbonate products detrimentally affecting the yield and purity of the resultant polycarboxylic amino acid salt.

In the practice of the present invention I have found that the rate at which the condensation and hydrolysis reactions proceed increase with increase in temperature and that at temperatures approximating 97° C. and within the range 95–99° C., the rates of condensation and hydrolysis are so rapid as to occur substantially simultaneously and instantly.

I have further discovered that the rate of the substitution reaction between the carboxylic acid salt hydrolysis product and the alpha amino acid resulting in the displacement of the amino hydrogens of the alpha amino nitrogen group while of a different order to that of the condensation and hydrolysis rates also varies with the temperature, increasing with increase in temperature such that at a temperature approximating 97° C. the rate of substitution reaction is relatively rapid as compared to temperatures below 80° C. and, what is of more importance, substantially no difference appears between the substitution rates for primary and secondary amino hydrogens as exists at temperatures below about 80° C.

In view of these discoveries, I prefer to practice the present invention at temperatures approximating 97° C. to take advantage of these more rapid rates of reaction while limiting the amount of the carboxylic acid salt hydrolysis product generated or formed in the solution at any instant to that which will be substantially immediately and completely reacted with the alpha amino acid salt.

To facilitate and accelerate the reactions, thereby insuring the completion of the same in the shortest possible time interval, the reaction solution also is vigorously agitated to maintain substantial uniform dispersion of the reactants therein.

I have also found that it is preferable to maintain in the reaction solution a substantially constant concentration of dissolved solids during the reaction which may vary widely, per se, without essential departure from the invention, within the range 20–50% (by weight) but preferably is maintained at about 30%.

There are a large number of alpha amino acids known in the art. Each if these acids, regardless of specific composition or structure, is characterized by having an amino nitrogen group attached to the alpha carbon. The amino hydrogens of this alpha amino group are the most reactive atoms present in the acid after neutralization of the carboxylic acid group present therein.

Many of these alpha amino acids may be synthesized or obtained in the substantially pure state. Most of these acids, however, are impure admixtures consisting of several or a plurality of acids. The primary source for alpha amino acids is from naturally occurring protein materials which are recognized generally in the art as consisting mainly of a mixture of alpha amino acid anhydrides. Upon hydrolysis (acid or alkaline) the anhydrides are converted to acids. By the practice of the present invention the alkali metal salts of these alpha amino acids reconstituted by hydrolysis from protein materials may be economically converted into polycarboxylic amino acids which generally have been recognized and employed in the art as deionizing or water softening agents, water soluble lubricants, detergents, dispersion agents for metallic soaps, dye leveling agents, buffering agents, and plasticizers.

As one specific example of the present invention but not as a limitation of the same, gelatine when hydrolyzed is substantially completely converted into glycine ($H_2N \cdot CH_2 \cdot COOH$). To convert this protein hydrolysate product into a polycarboxylic acid in accordance with the present invention the acid is first neutralized or converted into an alkali metal salt, such as $H_2N \cdot CH_2 \cdot COONa$.

This alkali metal salt is dissolved in water and sufficient caustic alkali is added thereto to insure an alkaline pH of at least 9 and preferably within the range 10–11 pH, and sodium cyanide in an amount providing one molar weight of cyanide for one molar weight of the alpha amino acid salt is added to the solution. A concentration of about 30% (by weight) of the dissolved solids is provided in this reaction solution. Such a reaction solution is formed, for example, by dissolving 97 pounds of the alpha amino acid salt, 50 pounds of sodium cyanide, and 7 pounds of NaOH in 500 pounds of water.

This reaction solution is placed in a container closed to the atmosphere by a reflux condenser venting the uncondensed gases passing the condenser into an ammonia absorption tower at a low positive pressure sufficient to exclude atmospheric gases from the container.

I next form a formaldehyde solution containing two molar weights of the formaldehyde for each molar weight of the alpha amino acid salt present in the reaction solution. The concentration of this solution preferably is about 35%.

The reaction solution is then heated to a temperature approximating 97° C. and the formaldehyde solution is added to the solution at a constant rate approximating that introducing the formaldehyde into the reaction solution at a rate of 2 molar weights per hour and the solution is vigorously agitated to maintain substantially uniform dispersion of the reactants therein. During the addition of the formaldehyde the temperature of the solution is maintained, by suitable cooling and heating means, substantially constant at approximately 97° C.

As the sodium cyanide present in the reaction solution becomes about 80% reacted a solution containing a second molar reacting weight of sodium cyanide as a 35% aqueous solution is fed slowly into the vigorously agitated reaction solution, without interrupting the addition of the formaldehyde solution thereto, the rate of such addition being limited to that which under the heating conditions provided will maintain the desired reaction temperature of 97° C. in the reaction solution and a large excess of the cyanide over the formaldehyde in the solution.

The concentration of the sodium cyanide solution added to the reaction solution during the formaldehyde addition, may vary widely without essential departure from the invention. The amount of water thus introduced into the reaction solution, along with the water entering the solution with the formaldehyde, preferably is limited to that required to replace water lost by vaporization and conversion to $NH_4OH$ by reaction with the gaseous $NH_3$ passing the reflux condenser and to maintain within the reaction solution a substantially constant concentration of dissolved solids therein of about 30%, by weight. Higher and lower concentrations of dissolved solids in the reaction solution may be employed, if desired, without essential departure from the invention but I have found that the maintaining of a constant concentration of said dissolved solids in the reaction solution is important in its effect on the rate of the substitution reaction. Variation in concentration produces variation in the rate of the substitution reaction and the most economically practical rate apparently is obtained at about 30% concentration of dissolved solids. To maintain this concentration the amount of the water present in the reaction solution must be increased gradually as the substitution reaction progresses and the glycine becomes converted to the polycarboxylic amino acid salt.

After the formaldehyde solution has been completely added to the reaction solution, the reaction solution is gradually heated to temperatures within the range 100–110° C. with continued vigorous agitation until substantially all of the gaseous ammonia present therein has been stripped out of the solution. To facilitate this ammonia stripping, steam may be passed directly into the solution, if desired.

The reaction solution is allowed to cool to atmospheric temperatures and the polycarboxylic acid product (triglycine) may be recovered from the solution by acidification with a strong mineral acid to a pH of about 1.8.

I believe the chemical reactions involved in this process to be essentially one of condensation, hydrolysis and substitution according to the following equations:

(1) $NaCN + CH_2O = NaO \cdot CH_2 \cdot CN$ (2) $NaO \cdot CH_2 \cdot CN + \dfrac{NaOH}{H_2O} = NaO \cdot CH_2 \cdot COONa + NH_3$ (gas)

(3) 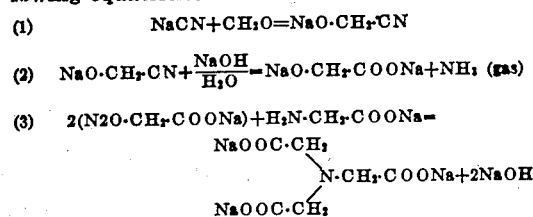

Under the conditions disclosed, the above reactions proceed substantially quantitatively to completion first to form the mono-substituted salt and then to form the di-substituted or triglycine salt. The first substitution reaction is exothermic in nature and to maintain the solution temperature at 97° C. cooling of the agitated solution must be practiced. The second substitution reaction is generally endothermic in nature and to maintain the solution temperature the agitated solution must be heated. Depending upon the closeness of adherence to the temperature of reaction and the rate of aldehyde addition as well as the maintenance of substantial constant concentration of dissolved solids within the reaction solution, and the purity of reactants employed, yields consistently within the range of 90-95% of the theoretical yield are obtainable by the invention.

As a second example of the invention, corn gluten when hydrolyzed yields mainly glutamic acid. The alkali metal salt of this acid is converted in part into the alkali metal salt of butyric alpha-amino acid in the presence of free alkali. By the practice of the present invention as hereinabove described, substituting the alkali metal salt of glutamic acid for the glycine salt of the specific example, the end carboxylic acid group of the glutamic acid in the strongly alkaline solution employed is in part lost in the process and the end $CH_2$ group is converted to a $CH_3$ group to form the alkali metal salt of the tricarboxylic amino acid:

$$CH_3 \cdot CH_2 \cdot CH(N \cdot (CH_2 \cdot COOH)_2) \cdot COOH$$

The process, therefore, with glutamic acid produces a mixture of this butyric acid alpha amino dicarboxylic acid and glutamic acid alpha amino dicarboxylic acid.

In place of glutamic acid derived from hydrolyzed corn gluten, glutamic acid derived from beet sugar and soy bean wastes may be employed.

Most protein substances, however, upon hydrolysis yield a mixture of alpha amino acids. Typical is the mixture of such acids obtained upon the hydrolysis of natural proteins. Various analyses of the amino acid mixture obtained from such proteins indicate that, in general, the following amino acids in varying amounts are obtained, the specific ranges given being that normally obtained from soy bean waste protein:

| Amino Acid | Per cent by weight unit of volume of solution |
| --- | --- |
| Glutamic Acid | 4.0 to 4.5 |
| Proline | 6.0 to 7.5 |
| Valine | 3.0 to 2.5 |
| Leucine | 10.5 to 6.0 |
| Isoleucine | 3.5 to 2.0 |
| Phenylalanine | 4.5 to 1.0 |
| Tyrosine | 4.0 to 1.0 |
| Trytophane | None |
| Methionine | 2.0 |
| Cystine | 2.0 to 0.0 |
| Arginine | 4.5 to 3.0 |
| Histidine | 2.0 to 1.5 |
| Lysine | 2.0 to 1.5 |
| Threonine | 5.0 to 2.0 |

On substituting this mixture of alpha amino acids for the glycine of the specific example given, it is believed apparent from the disclosure given, that all of the carboxylic acid groups of the acids first must be neutralized with caustic alkali using a sufficient excess of the alkali to provide a solution pH in excess of about 9 and preferably within the range 10-11. The total number of alpha amino nitrogen groups in the mixture of acids must then be determined by analysis and the amount of the sodium cyanide and formaldehyde to be employed to displace all of the amino hydrogens present by the carboxylic group $CH_2 \cdot COOH$ thus determined. One-half of the determined required amount of the cyanide is added to the reaction solution initially and the other half is added subsequently during the addition of the formaldehyde all as substantially disclosed in the specific example, all other conditions of the reaction being observed and followed.

The mixture of polycarboxylic acids obtained from this mixture of alpha amino acids has been found to be highly efficient as a water softening agent or deionizing agent being highly reactive with alkaline earth metal salts and magnesium salts to form water soluble compounds therewith and being highly reactive with metallic soap compounds to solubilize the same.

Various other examples of alpha amino acid conversion to polycarboxylic acids by the practice of this invention can be given but are not believed necessary to enable one skilled in the art to practice the invention as hereinabove disclosed.

In view of the above disclosure, it is believed apparent that the invention may be widely varied without essential departure therefrom and all such modifications and departures are contemplated as may fall within the scope of the following claims:

What I claim is:

1. The method of producing polycarboxylic amino acids which comprises condensing formaldehyde with sodium cyanide in a strongly alkaline solution having a pH above about 9 at a reaction temperature within the range 30-100° C. in the presence of an alkali metal salt of an alpha amino acid.

2. The method of producing polycarboxylic amino acids which comprises condensing formaldehyde with sodium cyanide in a vigorously agitated strongly alkaline solution having a pH above about 9 at a reaction temperature approximating 97° C. in the presence of an alkali metal salt of an alpha amino acid.

3. The method of producing polycarboxylic amino acids which comprises condensing formaldehyde with sodium cyanide in a vigorously agitated alkaline solution having a pH above about 9 at a reaction temperature of 97° C. in the presence of an alkali metal salt of an alpha amino acid under a low positive pressure of an inert gas excluding atmospheric gases from the heated agitated solution.

4. The method of producing polycarboxylic amino acids which comprises condensing formaldehyde with sodium cyanide in a vigorously agitated alkaline solution having a pH above about 9 at a reaction temperature of 97° C. in the presence of an alkali metal salt of an alpha amino acid under a low positive pressure of a nonreactive gas excluding atmospheric gases from the heated agitated solution, the rate of said condensation reaction being limited relative to the rate of formation of said polycarboxylic amino acid reaction product to approximately equal same.

5. The method of producing polycarboxylic amino acids which comprises condensing formaldehyde with sodium cyanide in a strongly alkaline aqueous solution having a pH above about 9 containing the alkali metal salt of an alpha amino acid maintained at a substantially constant reaction temperature approximately 97° C. and vigorously agitated to maintain a substantially uniform distribution of reactants therein with the surface of the agitated solution protected against atmospheric gas absorption, the rate of formaldehyde condensation with said cyanide being controlled and limited with respect to the rate of polycarboxylic amino acid formation in the said solution to not exceed same and the relative amounts of the said formaldehyde and cyanide approximating equivalent molar reacting weights to the total of amino hydrogens present in the alpha amino nitrogen group of the alpha amino acid.

6. The method of producing polycarboxylic amino acids which comprises dissolving an alkali metal salt of an alpha amino acid in water, adding caustic alkali thereto in an amount required to produce a pH above about 9, adding an alkali metal cyanide thereto in an amount providing a molar equivalent reacting weight of the cyanide for one of the amino hydrogens of the alpha amino nitrogen group of the amino acid, heating the solution to a temperature approximating 97° C. and within the range 95–99° C. and adding to the heated solution, while vigorously agitating the solution to maintain a uniform distribution of the reactants contained therein, a solution of formaldehyde at a rate relative to the rate of substitution of the amino hydrogen of the said amine by the carboxylic acid salt reaction product of aldehyde condensation and hydrolysis in said heated alkaline solution as results in the production of said carboxylic salt product at a rate approximating but not in excess of the rate of the substitution reaction of said salt for the amino hydrogen, and during said formaldehyde addition maintaining the temperature of the solution substantially constant at the reaction temperature of 97° C., and a low positive pressure of gaseous ammonia over the surface of the agitated solution sufficient to exclude atmospheric gases therefrom, and adding during the course of said formaldehyde addition a second molar reacting weight of said cyanide, terminating the formaldehyde addition when a total of two equivalent molar reacting weights of the formaldehyde has been introduced in the solution at the rate specified, and thereafter stripping the remaining ammonia gas from the solution before cooling to atmospheric temperatures and treating the solution for the recovery of the polycarboxylic amino acid reaction product present therein.

7. The method of converting glycine into triglycine which comprises forming a reaction solution containing a known weight of the alkali metal salt of glycine, caustic alkali sufficient to provide a solution pH above about 9, and sodium cyanide in an amount providing one molar weight per molar weight of the glycine salt, heating the said reaction solution to a reaction temperature approximating 97° C. and adding a formaldehyde solution containing 2 equivalent reacting molar weights of formaldehyde for each molecular weight of the glycine salt to the reaction solution while vigorously agitating the reaction solution to maintain a substantial uniform distribution of the reactants therein and while protecting the solution from contact with atmospheric gases, said formaldehyde addition being at a rate relative to the rate of triglycine formation as provides substantially no excess of the formaldehyde-sodium cyanide condensation product for hydrolysis to a carboxylic salt for substitution reaction with the glycine over that substantially immediately and completely reacted with said glycine, and during said formaldehyde addition adding to the reaction solution a second reacting equivalent molar weight of the said cyanide while maintaining substantially constant the reaction temperature of 97° C., stripping the reaction solution of gaseous ammonia, cooling the stripped solution and recovering the triglycine from the cooled solution.

FREDERICK C. BERSWORTH.

REFERENCES CITED

The following references are of record in the file of this patent:

UNITED STATES PATENTS

| Number | Name | Date |
|---|---|---|
| 2,097,864 | Platz | Nov. 2, 1937 |
| 2,168,181 | Ulrich | Aug. 1, 1939 |
| 2,239,617 | Moore | Apr. 22, 1941 |
| 2,387,976 | Bersworth | Oct. 30, 1945 |
| 2,407,645 | Bersworth | Sept. 17, 1946 |

FOREIGN PATENTS

| Number | Country | Date |
|---|---|---|
| 490,384 | Great Britain | Aug. 15, 1938 |

OTHER REFERENCES

Polstorff et al., Ber. Deut. Chem., vol. 45, pp. 1905–1907 (1912).